(12) United States Patent
Blackmer et al.

(10) Patent No.: US 7,854,466 B2
(45) Date of Patent: Dec. 21, 2010

(54) MOUNTING SYSTEM FOR BALLISTIC PANEL

(75) Inventors: Michael Paul Blackmer, Ann Arbor, MI (US); John Scott, London (CA); Scott Kahlbaum, Brownstown, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 462 days.

(21) Appl. No.: 11/565,084

(22) Filed: Nov. 30, 2006

(65) Prior Publication Data
US 2008/0129084 A1 Jun. 5, 2008

(51) Int. Cl.
*B60J 1/20* (2006.01)
(52) U.S. Cl. .................. 296/152; 296/146.1; 49/502
(58) Field of Classification Search ............. 49/502; 296/146.5, 146.6, 152
See application file for complete search history.

(56) References Cited

U.S. PATENT DOCUMENTS

| | | | | | |
|---|---|---|---|---|---|
| 3,704,037 | A | * | 11/1972 | Glassberg | 293/128 |
| 4,934,099 | A | * | 6/1990 | Maekawa et al. | 49/352 |
| 5,033,236 | A | * | 7/1991 | Szerdahelyi et al. | 49/502 |
| 5,340,189 | A | * | 8/1994 | Goodman | 296/152 |
| 5,679,918 | A | * | 10/1997 | Korpi et al. | 89/36.08 |
| 5,893,601 | A | * | 4/1999 | Carlberg | 296/153 |
| 5,931,682 | A | * | 8/1999 | Takiguchi et al. | 439/34 |
| 5,996,507 | A | * | 12/1999 | Joseph | 108/46 |
| 6,381,906 | B1 | * | 5/2002 | Pacella et al. | 49/502 |
| 6,546,674 | B1 | * | 4/2003 | Emerling et al. | 49/502 |
| 6,619,724 | B2 | * | 9/2003 | Blomeling et al. | 296/146.5 |
| 6,719,355 | B2 | * | 4/2004 | Ornig et al. | 296/146.5 |
| 6,979,047 | B2 | * | 12/2005 | Lin et al. | 296/146.7 |
| 6,988,759 | B2 | * | 1/2006 | Fin et al. | 296/146.7 |
| 7,059,659 | B2 | * | 6/2006 | Smith et al. | 296/146.7 |
| 2003/0107236 | A1 | * | 6/2003 | Ornig et al. | 296/146.5 |
| 2004/0049988 | A1 | * | 3/2004 | Reul et al. | 49/502 |
| 2005/0022658 | A1 | * | 2/2005 | Bateman et al. | 89/36.01 |
| 2006/0064938 | A1 | * | 3/2006 | Unterreiner et al. | 49/502 |
| 2006/0265961 | A1 | * | 11/2006 | Winborn et al. | 49/502 |

OTHER PUBLICATIONS

Dictionary.com, "ballistic," in The American Heritage® Dictionary of the English Language, Fourth Edition. Source location: Houghton Mifflin Company, 2004. http://dictionary.reference.com/browse/ballistic. Available: http://dictionary.reference.com. Accessed: Sep. 17, 2009. see definition in Final Action.*

Dictionary.com, "solid," in Dictionary.com Unabridged (v 1.1). Source location: Random House, Inc. http://dictionary.reference.com/browse/solid. Available: http://dictionary.reference.com. Accessed: Sep. 17, 2009. see definition in Fianl Action.*

* cited by examiner

*Primary Examiner*—Katherine W Mitchell
*Assistant Examiner*—Daniel Cahn
(74) *Attorney, Agent, or Firm*—Tung & Associates; Raymond L. Coppiellie

(57) ABSTRACT

A ballistic panel and mounting assembly for use with a vehicle door having a side impact structure. The panel having first and second separable members, and a plurality of upper brackets and side brackets used to secure the respective first and second members to both the beltline of the vehicle door and to the side impact structure. The brackets configured such that the panel is mounted outwardly of the window hardware and associated control mechanism and adjacent the side impact structure. In addition, connectors located on the first and second members operate to connect or join the respective members together.

9 Claims, 2 Drawing Sheets

MOUNTING SYSTEM FOR BALLISTIC PANEL

CROSS-REFERENCE TO RELATED APPLICATIONS

Not Applicable.

BACKGROUND OF THE INVENTION

1. Field of the Invention

A ballistic protection device for use with a vehicle, and more specifically a ballistic panel and mounting assembly for securing the ballistic panel between the inside and outside panels of a vehicle door.

2. Description of Related Art

Automotive vehicles are often used in situations that require or utilize vehicle armor to protect the occupants. In many instances, the armor is added to the vehicle after manufacture as an aftermarket item. Such aftermarket vehicle armor can be both conspicuous and cumbersome. Further, it may be desirable to avoid the appearance of armor on the vehicle, especially when using the vehicle in a discrete or undercover manner, for example, when used in association with law enforcement. In addition, the driver or passenger may utilize the armor by seeking protection behind the vehicle door when placing the vehicle door in an open position.

Depending upon the particular vehicle and type of armor, it can be both costly and difficult to modify standard production vehicles to accept the armor. In particular, the vehicle doors are typically designed to protect the vehicle occupants during side impacts. Thus, the vehicle structure often includes structural members, in particular side impact members placed within the vehicle door for reinforcing the vehicle compartment. In such situations, it may be difficult to add vehicle armor to the vehicle door while maintaining the integrity of the structural components. Further, difficulties exist in fitting the armor within the space constraints between the inner and outer door panels and not interfering with door or window equipment and the associated control hardware.

Accordingly, it is desirable to provide a ballistic protection panel that mounts within a vehicle door in a discrete and inconspicuous manner and provides protection for the vehicle occupants without requiring extensive modification of the existing door structure.

SUMMARY OF THE INVENTION

The present invention is a ballistic protection panel supported between the inside and outside panels of a vehicle door. The panel being further located between both the window and associated control hardware and a side impact structure located adjacent the outside panel of the vehicle door. The panel is formed of first and second separable members that are inserted independently into the space between the inside and outside panels of the vehicle door. Each of the first and second separable members having an upper bracket and a side bracket secured thereto, wherein the upper bracket engages and hangs the respective panel member from the beltline of the door and the side bracket secures the panel to the support structure of a side impact beam.

In accordance with one aspect of the invention, the upper bracket includes a hook portion positioned on one side of the panel and the side bracket includes an attachment flange located on the opposite side of the panel. Accordingly, the panel is fastened directly to the vehicle door assembly; and in particular, to the support structure of the side impact beam as close to the side impact beam as possible so as to not interfere with either the side impact beam or the window or window control mechanism.

DETAILED DESCRIPTION OF THE PREFERRED EMBODIMENTS

Figure 1:
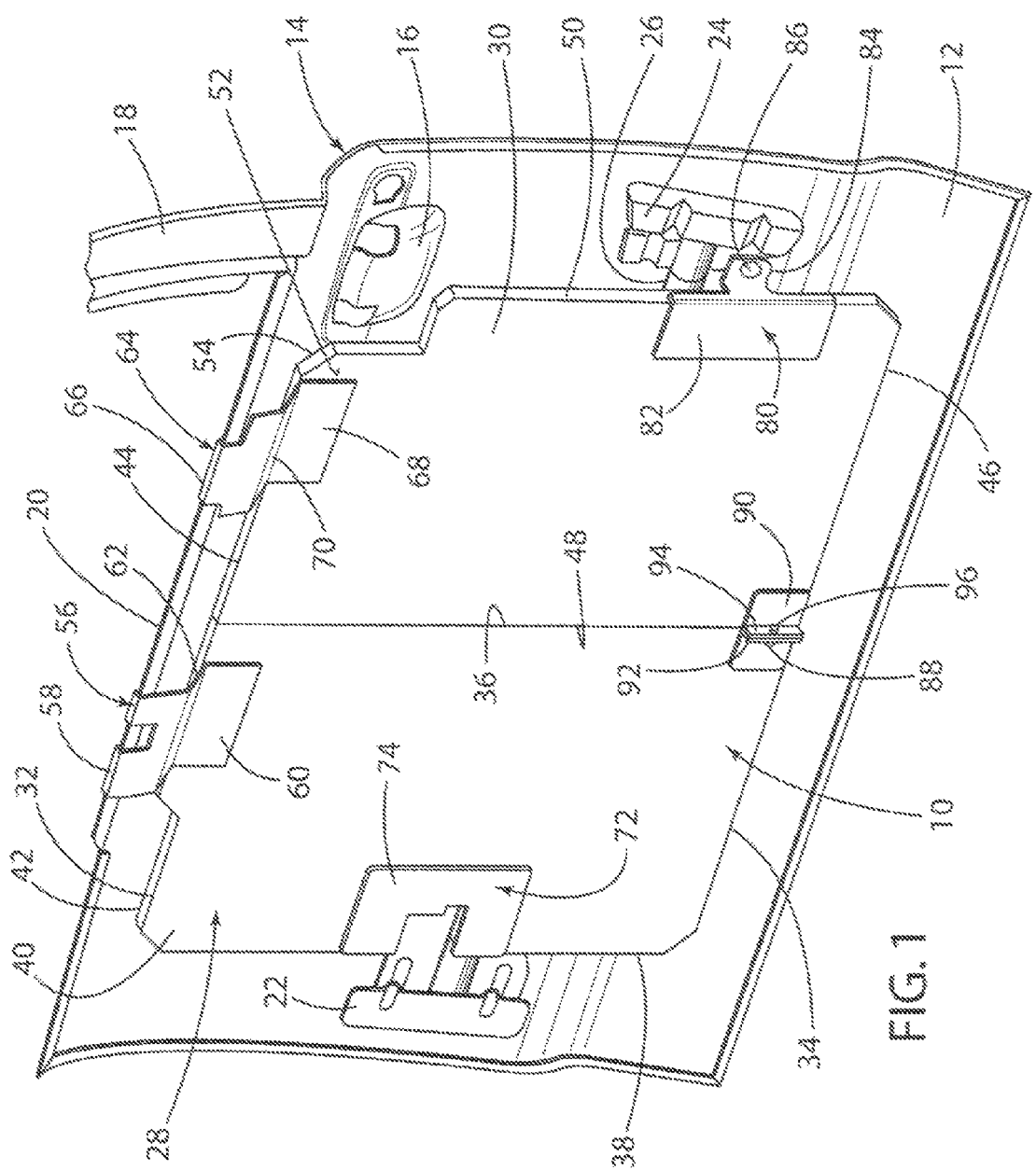
FIG. 1 is a perspective view of a ballistic protection panel according to the present invention shown attached to a vehicle door.
Figure 2:
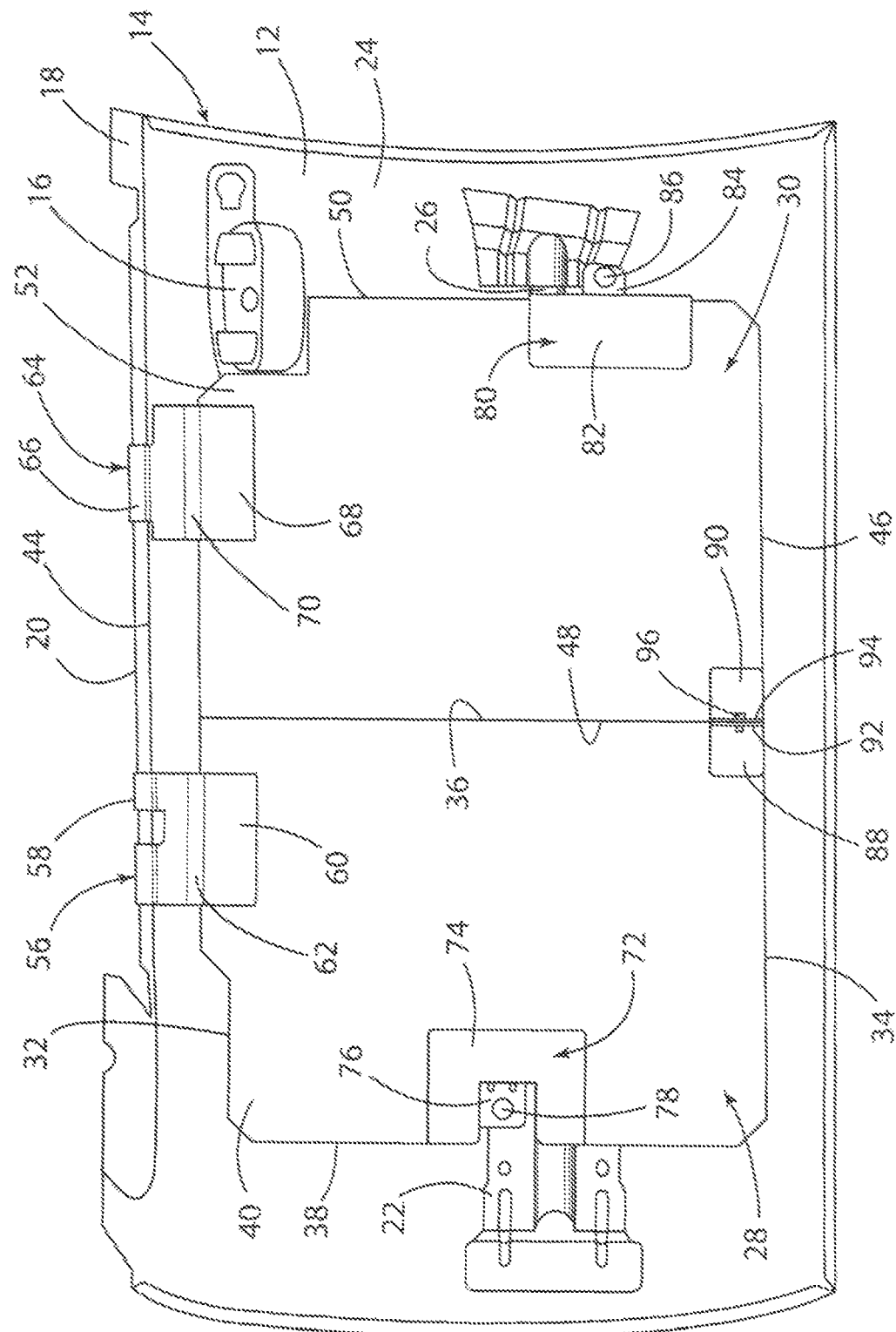
FIG. 2 is a front view of the ballistic protection panel of FIG. 1.

FIGS. 1-2 illustrate a ballistic protection panel, seen generally at 10, mounted on an outer panel 12 of a vehicle door, seen generally at 14. The door 14 includes a door handle and lock mounting structure 16, a window pillar 18 and a door belt line 20. A pair of mounting brackets 22, 24 secure a vehicle door impact beam 26 to the outer panel 12 of the door 14. The ballistic protection panel 10 is positioned on the door 14 between an inner panel (not shown) and the outer panel 12 with the window, window structure and associated control mechanism (not shown), located between the ballistic protection panel 10 and the inner panel.

The ballistic protection panel 10 is formed of a ballistic resistant material such as a ceramic composite. The panel 10 includes first and second separate members 28, 30. The first member 28 having a top 32, bottom 34, inner and outer sides 36, 38 and inner and outer surfaces of 40, 42. The second member 30 also has a top 44, bottom 46, inner and outer sides 48, 50 and inner and outer surfaces 52, 54. The respective inner sides 36, 48 of the first and second separable members 28, 30 have complementary mating surfaces. The complementary mating surfaces of the first and second members 28, 30 fit such that they form a joint when the respective inner sides 36, 48 of the first and second members 28, 30 are placed next to one another.

A first, upper bracket 56 attached to the inner surface 40 of the first member 28 adjacent the top 32 thereof hangs the first member 28 on the outer panel 12 of the vehicle door 14. The upper bracket 56 includes a hook portion 58 and an attachment portion or plate 60. The body of the upper bracket 56 includes a transition portion 62 formed by multiple bends in the upper bracket 56. The transition portion 62 operates to offset the hook portion 58 from the attachment portion 60. The hook portion 58 configured such that it engages the beltline 20 of the vehicle door 14 to hang the first member 28 on the vehicle door 14. As illustrated the overall configuration of the upper bracket 56, including the shape of the transition portion 62, is such that the first member 28 of the panel 10 is positioned outwardly of the beltline 20 and closer to the outer panel 12 of the vehicle door 14. Thus, the first member 28 is spaced from and disposed outwardly of the window opening located in the vehicle door 14.

The second member 30 of the panel 10 also includes an upper bracket 64. Like the upper bracket 56 of the first member 28, the upper bracket 64 of the second member 30 includes a hook portion 66, an attachment portion 68 and a transition portion 70. The hook portion 66 configured to hang the second member 30 from the beltline 20 of the vehicle door 14. Once again, the transition portion 70 offsets the attachment portion 68 from the hook portion 66 to position the second member 30 outwardly of the beltline 20 and adjacent the outer panel 12 of the vehicle door 14. Accordingly, the upper bracket brackets 56, 64 support the first and second members 28, 30 of the door panel 10 from the beltline 20 of the vehicle door 14.

A side bracket 72 having a mounting plate 74 and an attachment flange 76 secures the first member 28 to one of the mounting brackets 22 used to secure the vehicle door impact beam 26 to the vehicle door 14. As illustrated, the mounting plate 74 is secured to the inner surface 40 of the first member 28 with the attachment flange 76 extending outwardly past the outer surface 42 of the first member 28. The attachment flange 76 includes an aperture 78 sized to receive a fastener used to connect the side bracket 72 to the mounting bracket 22 of the door impact beam 26.

A second side bracket 80 secures the second member 30 to the mounting bracket 24 used to attach the opposite side of the door impact beam 26 to the vehicle door 14. The second side bracket 80 also includes a mounting plate 82 and an attachment flange 84. Once again, the mounting plate 82 is secured to the inner surface 52 of the second member 30 with the attachment flange 84 extending outwardly past the outer surface 54 of the second member 30. The attachment flange 84 having an aperture 86 used to connect the second side bracket 80 to the mounting bracket 24 of the door impact beam 26.

First and second L-shaped connectors 88, 90 attached adjacent the bottom 34, 46 of the respective first and second members 28, 30 and near the inner side 36, 48 of each member 28, 30 connect the first and second members 28, 30 together. As illustrated, the L-shaped members 88, 90 have opposed flange members 92, 94 positioned adjacent one another. Accordingly, a suitable fastener 96 extends through respective apertures in each flange member 92, 94 to secure the first and second members 28, 30 next to one another in a side-by-side relationship forming a joint between the inner sides 36, 48 of the first and second members 28, 30.

Accordingly, the first and second members 28, 30 of the ballistic protection panel 10 can be inserted separately into the interior of the vehicle door 14. Once inserted, they are fastened to the vehicle door impact beam mounting brackets 22, 24 without interfering with the vehicle door structure, in particular the vehicle door impact beam 26 and the door or window hardware or components thereof. In addition, since the hook portion 58, 66 of the upper brackets 56, 64 are hidden under the door or window trim that covers the beltline 20 of the vehicle door 14, the ballistic protection panel 10 of the present invention maintains the outward appearance of a normal or unmodified vehicle. Such a two-piece ballistic panel 10 enables coverage of a greater area of the door surface while providing adequate clearance for the door impact beam 26 and still allowing normal function of all door systems.

What is claimed is:

1. A ballistic protection member in combination with an automotive vehicle door having an impact structure comprising:
    a solid panel formed of a ballistic resistant material, said panel having first and second separable members;
    said first member having a top, bottom, outer side, inner side, an inner surface and an outer surface;
    a first member upper bracket attached to said first member adjacent to said top of said first member, said first member upper bracket including a hook portion, said hook portion of said first member upper bracket configured such that when said first member of said panel is disposed within the vehicle door, said hook portion of said first member upper bracket engages a beltline of the vehicle door;
    a first member side bracket attached to said inner surface of said first member adjacent to said outer side of said first member, said first member side bracket having an outwardly extending attachment flange that extends transversely past said outer surface of said first member, said attachment flange of said first member side bracket connected to said impact structure of the vehicle door;
    said second member having a top, bottom, outer side, inner side, an inner surface and an outer surface;
    a second member upper bracket attached to said inner surface of said second member adjacent to said top of said second member, said second member upper bracket including a hook portion, said hook portion of said second member upper bracket configured such that when said second member of said panel is disposed within the vehicle door, said hook portion of said second member upper bracket engages a beltline of the vehicle door;
    a second member side bracket attached to said inner surface of said second member adjacent to said outer side of said second member, said second member side bracket having an outwardly extending attachment flange that extends transversely past said outer surface of said second member, said attachment flange of said second member side bracket connected to said impact structure of the vehicle door; and
    a pair of connectors, a first connector of said pair of connectors attached to said inner surface of said first member near said inner side and adjacent said bottom of said first member and a second connector of said pair of connectors attached to the inner surface of said second member near said inner side and adjacent said bottom of said second member, said connectors configured such that when said first member and said second member are placed in a side-by-side relationship with the respective inner sides being adjacent, said connectors can be joined together to maintain the positional relationship between the respective first and second members.

2. A ballistic protection member in combination with an automotive vehicle door having an impact structure as set forth in claim 1 including said inner side of said first member having a first member mating surface and said inner side of said second member having a second member mating surface wherein said first member mating surface and said second member mating surface are complementary.

3. A ballistic protection member in combination with an automotive vehicle door having an impact structure as set forth in claim 1 wherein said connectors each have a respective generally L-shaped flange portion, each of said flange portions having a respective aperture therein for receiving a fastener used to join the respective connectors.

4. A ballistic protection member in combination with an automotive vehicle door having an impact structure as set forth in claim 1 wherein said first member upper bracket attached to said first member and said second member upper bracket attached to said second member are each configured such that a plane generally containing the respective hook portions is spaced from a plane generally containing respective attachment portions.

5. A ballistic protection member in combination with an automotive vehicle door having an impact structure as set forth in claim 1 wherein said attachment flange of said first member side bracket attached to said first member is attached to a first mounting bracket of said impact structure and said attachment flange of said second member side bracket attached to said second member is attached to a second mounting bracket of said impact structure.

6. A ballistic protection member in combination with an automotive vehicle door having an impact structure as set forth in claim 1 wherein said first member upper bracket and said second member upper bracket attached to said respective first member and said second member each include an attachment portion, said attachment portion of said first member upper bracket and said second member upper bracket attached respectively to said inner surface of said first member and to said inner surface of said second member.

7. A ballistic protection member in combination with an automotive vehicle door having an impact structure as set forth in claim 1 wherein said hook portions of said respective first and second member upper brackets are located on one side of said panel and said attachment flanges of said respective first and second member side brackets are located on another side of said panel.

8. A ballistic protection member in combination with an automotive vehicle door having an impact structure comprising:
   a solid panel formed of a ballistic resistant material, said panel having first and second separable members;
   said first member having a top, bottom, outer side, inner side, an inner surface, an outer surface and a mating surface located adjacent said inner side;
   a first member upper bracket attached to said first member adjacent to said top of said first member, said first member upper bracket including a hook portion, said hook portion of said first member upper bracket configured such that when said first member of said panel is disposed within the vehicle door, said hook portion of said first member upper bracket engages a beltline of the vehicle door;
   a first member side bracket attached to said inner surface of said first member adjacent to said outer side of said first member, said first member side bracket having an outwardly extending attachment flange that extends transversely past said outer surface of said first member, said attachment flange of said first member side bracket connected to said impact structure of the vehicle door;
   said second member having a top, bottom, outer side, inner side, an inner surface, an outer surface and a mating surface located adjacent said inner side of second member;
   a second member upper bracket attached to said inner surface of said second member adjacent to said top of said second member, said second member upper bracket including a hook portion, said hook portion of said second member upper bracket configured such that when said second member of said panel is disposed within the vehicle door, said hook portion of said second member upper bracket engages a beltline of the vehicle door;
   a second member side bracket attached to said inner surface of said second member adjacent to said outer side of said second member, said second member side bracket having an outwardly extending attachment flange that extends transversely past said outer surface of said second member, said attachment flange of said second member side bracket connected to said impact structure of the vehicle door;
   said first member and second member upper brackets configured such that said respective hook portions of said first member and second member upper brackets are located on one side of said panel and said attachment flanges of said first member and second member side brackets are located on another side of said panel; and
   a pair of connectors, a first connector of said pair of connectors is attached to said inner surface of said first member near said inner side and adjacent said bottom of said first member and a second connector of said pair of connectors is attached to the inner surface of said second member near said inner side and adjacent said bottom of said second member, said connectors configured such that when said first member and said second member are placed in a side-by-side relationship with the respective inner sides being adjacent, said connectors can be joined together to maintain a positional relationship between the respective first and second members.

9. A ballistic protection member in combination with an automotive vehicle door having an impact structure as set forth in claim 8 wherein each of said connectors include a respective L-shaped member, each of said L-shape members having a respective flange member extending outward from said respective inner surfaces, each of said flange members having a respective aperture sized to receive a fastener used to connect the respective flange members.

* * * * *